(12) United States Patent
Lucas et al.

(10) Patent No.: US 11,192,712 B2
(45) Date of Patent: Dec. 7, 2021

(54) BULK MATERIAL HANDLING SYSTEM FOR REDUCED DUST, NOISE, AND EMISSIONS

(71) Applicant: Halliburton Energy Services, Inc., Houston, TX (US)

(72) Inventors: Bryan Chapman Lucas, Duncan, OK (US); Wesley John Warren, Marlow, OK (US); Calvin L. Stegemoeller, Duncan, OK (US); Austin Carl Schaffner, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/876,577

(22) Filed: May 18, 2020

(65) Prior Publication Data
US 2020/0277133 A1     Sep. 3, 2020

Related U.S. Application Data

(63) Continuation of application No. 16/308,921, filed as application No. PCT/US2016/043271 on Jul. 21, 2016, now Pat. No. 10,919,693.

(51) Int. Cl.
*B65D 88/30*     (2006.01)
*B65D 88/12*     (2006.01)
(Continued)

(52) U.S. Cl.
CPC ............ *B65D 88/12* (2013.01); *B01F 3/1271* (2013.01); *B01F 15/00961* (2013.01);
(Continued)

(58) Field of Classification Search
CPC .................................................. B65D 88/30
See application file for complete search history.

(56) References Cited

U.S. PATENT DOCUMENTS

| 710,611 A | 10/1902 | Ray |
| 802,254 A | 10/1905 | Baker et al. |

(Continued)

FOREIGN PATENT DOCUMENTS

| EP | 2937826 A1 | 10/2015 |
| GB | 2066220 A | 7/1981 |

(Continued)

OTHER PUBLICATIONS

International Search Report and Written Opinion issued in related PCT Application No. PCT/US2016/043271 dated Apr. 18, 2017, 16 pages.

(Continued)

*Primary Examiner* — Jonathan Snelting
(74) *Attorney, Agent, or Firm* — John Wustenberg; Baker Botts L.L.P.

(57) ABSTRACT

Methods for handling bulk material in a manner that reduces dust, noise, and emissions are provided. The presently disclosed techniques use portable containers to transfer bulk material from a transportation unit to a blender inlet. The containers may be carried to the location on the transportation unit, where a hoisting mechanism is used to remove the container from the transportation unit and place it in a desired location. When bulk material is needed at the blender inlet, the hoisting mechanism may position the container of bulk material onto an elevated support structure. Once on the support structure, the container may be opened to release bulk material to a gravity feed outlet, which routes the bulk material from the container directly into the blender inlet. The disclosed containerized bulk material transfer system and method allows for reduced dust, noise, and emissions on location.

20 Claims, 5 Drawing Sheets

(51) Int. Cl.
  *B01F 15/00* (2006.01)
  *B01F 15/02* (2006.01)
  *B08B 15/02* (2006.01)
  *B60P 7/13* (2006.01)
  *B62D 63/06* (2006.01)
  *B65D 88/26* (2006.01)
  *B65D 90/12* (2006.01)
  *B65D 90/20* (2006.01)
  *B65D 90/54* (2006.01)
  *B65D 90/58* (2006.01)
  *B65G 63/00* (2006.01)
  *E21B 21/06* (2006.01)
  *F16M 11/22* (2006.01)
  *B01F 3/12* (2006.01)
  *B60P 1/36* (2006.01)

(52) U.S. Cl.
  CPC ...... *B01F 15/0216* (2013.01); *B01F 15/0235* (2013.01); *B08B 15/02* (2013.01); *B60P 7/13* (2013.01); *B62D 63/06* (2013.01); *B62D 63/068* (2013.01); *B65D 88/26* (2013.01); *B65D 90/12* (2013.01); *B65D 90/20* (2013.01); *B65D 90/54* (2013.01); *B65D 90/582* (2013.01); *B65G 63/004* (2013.01); *E21B 21/062* (2013.01); *F16M 11/22* (2013.01); *B01F 2215/0081* (2013.01); *B60P 1/36* (2013.01)

(56) References Cited

U.S. PATENT DOCUMENTS

| | | |
|---|---|---|
| 917,646 A | 4/1909 | Newey |
| 1,519,153 A | 12/1924 | Mitton |
| 1,726,603 A | 9/1929 | Allen |
| 1,795,987 A | 3/1931 | Adams |
| 2,231,911 A | 2/1941 | Hitt et al. |
| 2,281,497 A | 4/1942 | Hyson et al. |
| 2,385,245 A | 9/1945 | Willoughby |
| 2,415,782 A | 2/1947 | Zademach et al. |
| 2,513,012 A | 6/1950 | Dugas |
| 2,563,470 A | 8/1951 | Kane |
| 2,652,174 A | 9/1953 | Shea et al. |
| 2,670,866 A | 3/1954 | Glesby |
| 2,678,737 A | 5/1954 | Mangrum |
| 2,759,737 A | 8/1956 | Manning |
| 2,802,603 A | 8/1957 | Mccray |
| 2,867,336 A | 1/1959 | Soldini et al. |
| 3,049,248 A | 8/1962 | Heltzel et al. |
| 3,083,879 A | 4/1963 | Coleman |
| 3,151,779 A | 10/1964 | Rensch et al. |
| 3,203,370 A | 8/1965 | Friedrich et al. |
| 3,217,927 A | 11/1965 | Bale, Jr. et al. |
| 3,318,473 A | 5/1967 | Jones et al. |
| 3,326,572 A | 6/1967 | Murray |
| 3,343,688 A | 9/1967 | Ross |
| 3,354,918 A | 11/1967 | Coleman |
| 3,380,333 A | 4/1968 | Clay et al. |
| 3,404,963 A | 10/1968 | Fritsche et al. |
| 3,410,530 A | 11/1968 | Gilman |
| 3,432,151 A | 3/1969 | O'Loughlin et al. |
| 3,467,408 A | 9/1969 | Regalia |
| 3,476,270 A | 11/1969 | Cox et al. |
| 3,602,400 A | 8/1971 | Cooke |
| 3,627,555 A | 12/1971 | Driscoll |
| 3,698,693 A | 10/1972 | Poncet |
| 3,785,534 A | 1/1974 | Smith |
| 3,802,584 A | 4/1974 | Sackett et al. |
| 3,986,708 A | 10/1976 | Heltzel et al. |
| 4,023,719 A | 5/1977 | Noyon |
| 4,058,239 A | 11/1977 | Van Mill |
| 4,138,163 A | 2/1979 | Calvert et al. |
| 4,178,117 A | 12/1979 | Brugler |
| 4,204,773 A | 5/1980 | Bates |
| 4,248,337 A | 2/1981 | Zimmer |
| 4,258,953 A | 3/1981 | Johnson |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,544,279 A | 10/1985 | Rudolph |
| 4,548,507 A | 10/1985 | Mathis et al. |
| 4,583,663 A | 4/1986 | Bonerb |
| 4,626,166 A | 12/1986 | Jolly |
| 4,701,095 A | 10/1987 | Berryman et al. |
| 4,806,065 A | 2/1989 | Holt et al. |
| 4,850,702 A | 7/1989 | Arribau et al. |
| 4,856,681 A | 8/1989 | Murray |
| 4,900,157 A | 2/1990 | Stegemoeller et al. |
| 4,919,540 A | 4/1990 | Stegemoeller et al. |
| 4,953,752 A | 9/1990 | Tousignant et al. |
| 4,956,821 A | 9/1990 | Fenelon |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin et al. |
| 5,149,192 A | 9/1992 | Hamm et al. |
| 5,303,998 A | 4/1994 | Whitlatch et al. |
| 5,339,996 A | 8/1994 | Dubbert et al. |
| 5,343,813 A | 9/1994 | Septer |
| 5,375,730 A | 12/1994 | Bahr et al. |
| 5,401,129 A | 3/1995 | Eatinger |
| 5,413,154 A | 5/1995 | Hurst et al. |
| 5,415,323 A | 5/1995 | Fenelon |
| 5,426,137 A | 6/1995 | Allen |
| 5,441,321 A | 8/1995 | Karpisek |
| 5,443,350 A | 8/1995 | Wilson |
| 5,445,289 A | 8/1995 | Owen |
| 5,590,976 A | 1/1997 | Kilheffer et al. |
| 5,609,417 A | 3/1997 | Otte |
| 5,722,552 A | 3/1998 | Olson |
| 5,772,390 A | 6/1998 | Walker |
| 5,806,441 A | 9/1998 | Chung |
| 5,913,459 A | 6/1999 | Gill et al. |
| 5,915,913 A | 6/1999 | Greenlaw et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | Mcdonald et al. |
| 6,112,946 A | 9/2000 | Bennett et al. |
| 6,126,307 A | 10/2000 | Black et al. |
| 6,193,402 B1 | 2/2001 | Grimland et al. |
| 6,247,594 B1 | 6/2001 | Garton |
| 6,379,086 B1 | 4/2002 | Goth |
| 6,425,627 B1 | 7/2002 | Gee |
| 6,491,421 B2 | 12/2002 | Rondeau et al. |
| 6,517,232 B1 | 2/2003 | Blue |
| 6,536,939 B1 | 3/2003 | Blue |
| 6,537,015 B2 | 3/2003 | Lim et al. |
| 6,568,567 B2 | 5/2003 | Mckenzie et al. |
| 6,622,849 B1 | 9/2003 | Sperling |
| 6,655,548 B2 | 12/2003 | Mcclure et al. |
| 6,876,904 B2 | 4/2005 | Oberg et al. |
| 6,980,914 B2 | 12/2005 | Bivens et al. |
| 7,008,163 B2 | 3/2006 | Russell |
| 7,086,342 B2 | 8/2006 | O'Neall et al. |
| 7,100,896 B1 | 9/2006 | Cox |
| 7,114,905 B2 | 10/2006 | Dibdin |
| 7,252,309 B2 | 8/2007 | Eng Soon et al. |
| 7,284,579 B2 | 10/2007 | Elgan et al. |
| 7,451,015 B2 | 11/2008 | Mazur et al. |
| 7,475,796 B2 | 1/2009 | Garton |
| 7,500,817 B2 | 3/2009 | Furrer et al. |
| 7,513,280 B2 | 4/2009 | Brashears et al. |
| 7,665,788 B2 | 2/2010 | Dibdin et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |

(56) References Cited

U.S. PATENT DOCUMENTS

| | | |
|---|---|---|
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-Pusset et al. |
| 8,573,917 B2 | 11/2013 | Renyer |
| 8,585,341 B1 | 11/2013 | Oren et al. |
| 8,607,289 B2 | 12/2013 | Brown et al. |
| 8,616,370 B2 | 12/2013 | Allegretti et al. |
| 8,622,251 B2 | 1/2014 | Oren |
| 8,662,525 B1 | 3/2014 | Dierks et al. |
| 8,668,430 B2 | 3/2014 | Oren et al. |
| D703,582 S | 4/2014 | Oren |
| 8,827,118 B2 | 9/2014 | Oren |
| 8,834,012 B2 | 9/2014 | Case et al. |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,604,338 B2 | 3/2020 | Allegretti |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 | 1/2007 | Diosse et al. |
| 2007/0201305 A1 | 8/2007 | Heilman et al. |
| 2008/0187423 A1 | 8/2008 | Mauchle et al. |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0314791 A1 | 12/2009 | Hartley et al. |
| 2010/0196129 A1 | 8/2010 | Buckner |
| 2010/0319921 A1 | 12/2010 | Eia et al. |
| 2011/0076123 A1 | 3/2011 | Beck |
| 2012/0017812 A1 | 1/2012 | Renyer et al. |
| 2012/0018093 A1 | 1/2012 | Zuniga et al. |
| 2012/0037231 A1 | 2/2012 | Janson et al. |
| 2012/0181093 A1 | 7/2012 | Fehr et al. |
| 2012/0219391 A1 | 8/2012 | Teichrob et al. |
| 2013/0128687 A1 | 5/2013 | Adams |
| 2013/0135958 A1 | 5/2013 | O'Callaghan |
| 2013/0142601 A1 | 6/2013 | Mciver et al. |
| 2013/0206415 A1 | 8/2013 | Sheesley |
| 2013/0284729 A1 | 10/2013 | Cook et al. |
| 2014/0023463 A1 | 1/2014 | Oren |
| 2014/0023464 A1 | 1/2014 | Oren et al. |
| 2014/0044508 A1 | 2/2014 | Luharuka et al. |
| 2014/0076569 A1 | 3/2014 | Pham et al. |
| 2014/0083554 A1 | 3/2014 | Harris |
| 2014/0216736 A1 | 8/2014 | Leugemors et al. |
| 2014/0299226 A1 | 10/2014 | Oren et al. |
| 2014/0305769 A1 | 10/2014 | Eiden, III et al. |
| 2014/0377042 A1 | 12/2014 | Mcmahon |
| 2015/0003943 A1 | 1/2015 | Oren et al. |
| 2015/0003955 A1 | 1/2015 | Oren et al. |
| 2015/0016209 A1 | 1/2015 | Barton et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0303770 A1 | 10/2015 | Beissler et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | Mciver et al. |
| 2017/0123437 A1 | 5/2017 | Boyd et al. |
| 2017/0129696 A1 | 5/2017 | Oren |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0320660 A1 | 11/2017 | Sanders et al. |
| 2017/0327326 A1 | 11/2017 | Lucas et al. |
| 2017/0334639 A1 | 11/2017 | Hawkins et al. |
| 2017/0349226 A1 | 12/2017 | Oren et al. |
| 2018/0002120 A1 | 1/2018 | Allegretti et al. |
| 2018/0201437 A1 | 7/2018 | Surjaatmadja et al. |
| 2018/0257814 A1 | 9/2018 | Allegretti et al. |

(56) References Cited

U.S. PATENT DOCUMENTS

| | | |
|---|---|---|
| 2018/0369762 A1 | 12/2018 | Hunter et al. |
| 2019/0009231 A1 | 1/2019 | Warren et al. |
| 2019/0111401 A1 | 4/2019 | Lucas et al. |
| 2020/0062448 A1 | 2/2020 | Allegretti et al. |

FOREIGN PATENT DOCUMENTS

| | | | |
|---|---|---|---|
| GB | 2204847 | A | 11/1988 |
| JP | 2008239019 | A | 10/2008 |
| WO | 2008012513 | A2 | 1/2008 |
| WO | 2013095871 | A1 | 6/2013 |
| WO | 2013142421 | A1 | 9/2013 |
| WO | 2014018129 | A1 | 1/2014 |
| WO | 2014018236 | A2 | 1/2014 |
| WO | 2015119799 | A1 | 8/2015 |
| WO | 2015191150 | A1 | 12/2015 |
| WO | 2015192061 | A1 | 12/2015 |
| WO | 2016044012 | A1 | 3/2016 |
| WO | 2016160067 | A1 | 10/2016 |
| WO | 2016178691 | A1 | 11/2016 |
| WO | 2016178692 | A1 | 11/2016 |
| WO | 2016178694 | A1 | 11/2016 |
| WO | 2016178695 | A1 | 11/2016 |
| WO | 2017/014768 | A1 | 1/2017 |
| WO | 2017/014771 | A1 | 1/2017 |

OTHER PUBLICATIONS

International Preliminary Report on Patentability issued in related PCT Application No. PCT/US2016/043271 dated Jan. 31, 2019, 13 pages.
Office Action issued in related Canadian Patent Application No. 2,996,055 dated Oct. 2, 2020, 5 pages.

BULK MATERIAL HANDLING SYSTEM FOR REDUCED DUST, NOISE, AND EMISSIONS

CROSS REFERENCE TO RELATED APPLICATIONS

The present application is a Continuation of U.S. patent application Ser. No. 16/308,921 filed Dec. 11, 2018, which is a U.S. National Stage Application of International Application No. PCT/US2016/043271 filed Jul. 21, 2016, both of which are incorporated herein by reference in their entirety for all purposes.

TECHNICAL FIELD

The present disclosure relates generally to transferring bulk materials, and more particularly, to a bulk material delivery system and method for reducing dust, noise, and engine emissions at a job site.

BACKGROUND

During the drilling and completion of oil and gas wells, various wellbore treating fluids are used for a number of purposes. For example, high viscosity gels and proppant infused liquids are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material into a blender tub.

There is a larger emphasis on dust, noise, and emissions control at job sites than ever before with customers and regulatory bodies. Therefore, bulk material handling applications that cut down on the dust, noise, and engine emissions on location are desired.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
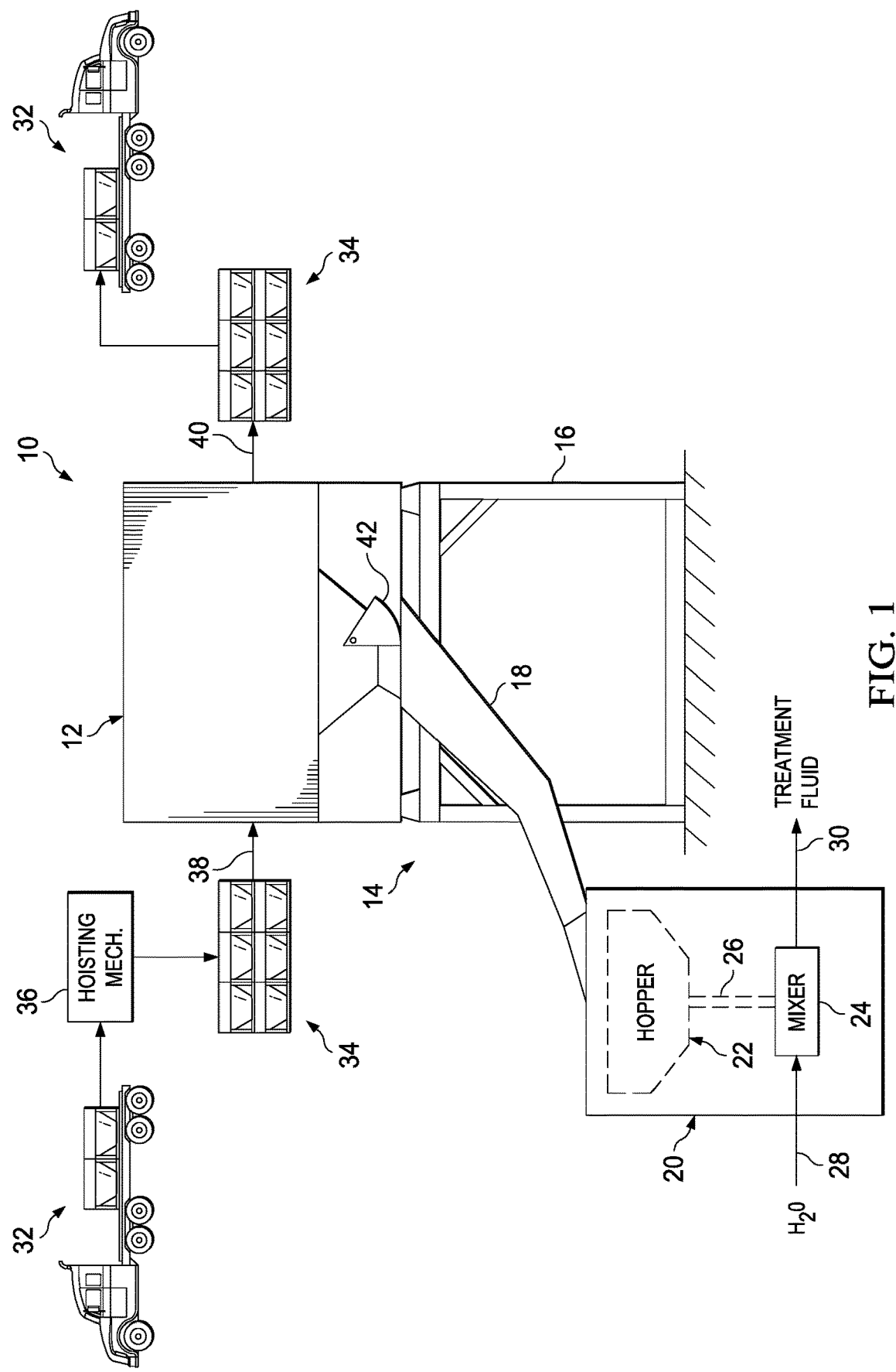
FIG. 1 is a schematic block diagram of a containerized bulk material handling system, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently delivering bulk material into an inlet of a blender unit at a job site. Disclosed embodiments may include a system and method for transporting and releasing bulk materials into the blender inlet in a manner that reduces dust, noise, and engine emissions on location. The disclosed techniques may be used to efficiently handle any desirable bulk material having a solid or liquid constituency including, but not limited to, sand, proppant, gel particulate, diverting agent, dry-gel particulate, liquid additives, acid, chemicals, cement, and others.

In currently existing on-site bulk material handling applications, bulk material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, augers, chutes, conveyor belts, and other components. However, these existing techniques for transferring bulk material about a job site can release large amounts of undesirable dust, noise, and engine emissions into the atmosphere.

As an example, dust is often generated on location from pneumatic transfer of bulk material via pressurized air flow from a transportation unit (e.g., tank truck) to a receiving bin (e.g., silo). When bulk material is carried from the transportation unit in a fluidized airstream to the receiving bin, the bulk material strikes a plate to knock the bulk material down into the bin. When this occurs, a large amount of dust is generated and becomes airborne in the receiving bin. The blown airstream is then vented to keep from pressurizing the receiving bin, and dust that is being carried in the airstream is released to the atmosphere. This process can release a significant amount of dust into the atmosphere. Techniques to capture the airborne dust require additional external equipment and operators, and these efforts can be quite costly.

Dust can also be generated when bulk material is transferred from one piece of equipment to the next on location. For example, the bulk material may "fall" from one conveyor belt to another, or from a belt to the sand pile at a blender hopper, releasing dust into the air upon impact. Capturing this dust can be complicated and expensive, since the dust is often generated at multiple transfer points, with each transfer point requiring an enclosure, ventilation, and filtering to prevent release of the dust.

The process of pneumatically filling a receiving bin with bulk material from a transportation unit can be very noisy as well, due to the use of compressors or blowers to create the airstream needed to carry the bulk material. The high noise levels are often sustained for long periods of time, since blowing the bulk material pneumatically from a transportation unit to a storage/delivery system is a time consuming process taking at least an hour to empty a single truck. Multiple transportation units are sometimes operated at the same time to pneumatically fill one or more receiving bins on location, thereby further increasing the noise levels.

The transportation units can also generate significant engine emissions on location due to running diesel engines during pneumatic filling as well as operating the transportation units when they are waiting to move into position to unload their contents. For example, at any one time, a dozen or more transportation units may be idling (while running heating and cooling) until it is their turn to pneumatically unload the contents. In addition, the engines powering the storage bins that receive bulk material from the transportation units contribute to the release of engine emissions on location.

The bulk material handling systems and methods disclosed herein are designed to address and eliminate the shortcomings associated with existing material handling systems. The presently disclosed techniques use one or more portable containers to transfer bulk material from a transportation unit to a blender inlet (e.g., blender hopper or mixer inlet). The portable containers may be carried to the location on a transportation unit (e.g., truck trailer), where a hoisting mechanism (e.g., forklift, crane, or other system) is used to remove the container from the transportation unit and place it in a desired location. When bulk material is needed at the blender inlet, a hoisting mechanism may position the container of bulk material onto an elevated support structure. Once on the support structure, the container may be opened to release bulk material to a gravity feed outlet, which routes the bulk material from the container directly into the blender inlet.

The disclosed containerized bulk material transfer system and method allows for reduced dust, noise, and engine emissions on location. For example, the bulk material can be removed from the transportation unit very quickly when disposed in portable containers and without generating any dust on location. The support structure may elevate the bulk material containers to a sufficient height above the blender inlet and route the bulk material directly from the containers to the blender inlet via a gravity feed to reduce or eliminate dust generation at this transfer point on location. The transportation units can be unloaded relatively quickly via removal of the containers, thereby reducing the engine emissions associated with multiple transportation units waiting to be unloaded. Further, the noise levels are reduced on location since pneumatic transfer is not being used to convey bulk material from the transportation units to a separate receiving bin.

Turning now to the drawings, FIG. 1 is a block diagram of a bulk material handling system 10. The system 10 includes one or more containers 12 elevated on a support structure 14 and holding a quantity of bulk material (e.g., solid or liquid treating material). Although only one such container 12 is illustrated in FIG. 1, other embodiments of the system 10 may feature multiple bulk material containers 12 disposed on a support structure 14. The container 12 may utilize a gravity feed to provide a controlled, i.e. metered, flow of bulk material at an outlet 18.

The container 12 is separate from other containers of bulk material at the job site and is independently transportable about the job site (e.g., for placement on or removal from the support structure 14).

In the illustrated embodiment, the support structure 14 may include a frame 16 for receiving and holding the one or more containers 12 and one or more gravity feed outlets 18 for directing bulk material away from the respective containers 12. For example, in the illustrated embodiment, the support structure 14 includes a single gravity feed outlet 18 for directing bulk material from the container 12 disposed on the frame 16. The outlet 18 may be coupled to and extend from the frame 16. The outlet 18 may utilize a gravity feed to provide a controlled, i.e. metered, flow of bulk material from the container 12 to a blender unit 20. The outlet 18 may be a chute that directs the bulk material from the container 12 to the blender 20.

Although just one support structure 14 is shown in FIG. 1, other embodiments of the bulk material handling system 10 may include multiple separate support structures 14 having one or more bulk material containers 12 disposed thereon, and all of these support structures 14 may feed into the blender unit 20. In some embodiments, the support structures 14 may each hold a single container 12. In other embodiments, the support structures 14 may each hold multiple containers 12. In still other embodiments, one support structure 14 may hold a single container 12 while another support structure 14 holds multiple containers 12.

As illustrated, the blender unit 20 may include a hopper 22 and a mixer 24 (e.g., mixing compartment). The blender unit 20 may also include a metering mechanism 26 for providing a controlled, i.e. metered, flow of bulk material from the hopper 22 to the mixer 24. However, in other embodiments the blender unit 20 may not include the hopper 22, such that the outlet 18 of the support structure 14 may provide bulk material directly into the mixer 24.

Water and other additives may be supplied to the mixer 24 (e.g., mixing compartment) through a fluid inlet 28. As those of ordinary skill in the art will appreciate, the fluid inlet 28 may include more than the one input flow line illustrated in FIG. 1. The bulk material and water may be mixed in the mixer 24 to produce (at an outlet 30) a hydraulic fracturing fluid, a mixture combining multiple types of proppant, proppant/dry-gel particulate mixture, sand/sand-diverting agents mixture, cement slurry, drilling mud, a mortar or concrete mixture, or any other fluid mixture for use on location. The outlet 30 may be coupled to a pump for transporting the treating fluid to a desired location (e.g., a hydrocarbon recovery well) for a treating process.

It should be noted that the disclosed containers 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, one or more containers 12 may be elevated above an outlet location via the frame 16. The support structure 14 is designed to elevate the container 12 above the level of the blender inlet (e.g., blender hopper 22 and/or mixing tub 24) to allow the bulk material to gravity feed from the container 12 to the blender unit 20. This way, the container 12 is able to sit on the frame 16 of the support structure 14 and output bulk material directly into the blender unit 20 via the gravity feed outlet 18 of the support structure 14.

As illustrated, the containers 12 may each include a discharge gate 42 for selectively dispensing or blocking a flow of bulk material from the container 12. In some embodiments, the discharge gate 42 may include a rotary clamshell gate. However, other types of discharge gates 42 that can be actuated open and closed may be used. When the discharge gate 42 is closed, the gate 42 may prevent bulk material from flowing from the container 12 to the outlet 18. The discharge gate 42 may be selectively actuated into an open position (as shown in the illustrated embodiment) to release the bulk material from the container 12. When it is desired to stop the flow of bulk material, or once the container 12 is emptied, the discharge gate 42 may then be actuated (e.g., rotated or translated) back to the closed position to block the flow of bulk material.

The support structure 14 may also include one or more actuators (not shown) designed to aid in actuation of the discharge gate 42 of the one or more containers 12 disposed on the frame 16. The actuators may be rotary actuators designed to rotate into engagement with the discharge gate 42 to transition the gate between a closed position and an open position. In other embodiments, the actuators may be linear actuators designed to interface with the discharge gate 42 to selectively open and close the gate. By utilizing actuators disposed on the support structure 14 to actuate the discharge gate 42 between open and closed positions, the system 10 may prevent the container 12 from releasing bulk material before the container 12 is positioned on the support structure 14 for releasing material directly into the blender unit 20.

Figure 2:
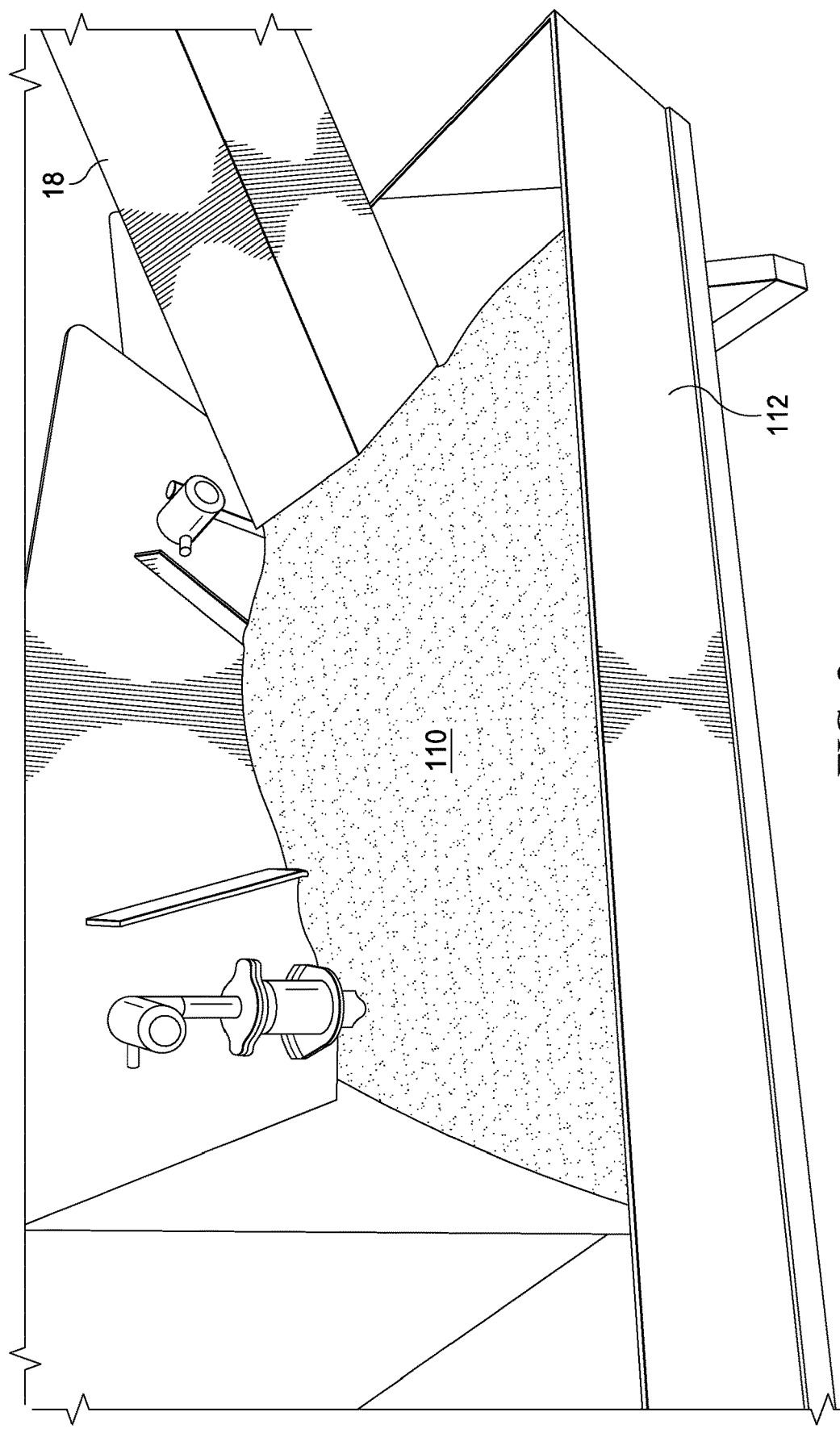
FIG. 2 is a perspective view of a pile of bulk material being used to regulate a gravity feed of bulk material to a blender inlet, in accordance with an embodiment of the present disclosure.

Significantly reduced dust is generated on location at this transfer point between the container 12 and the blender unit 20, due to the outlet 18 gravity feeding the bulk material from the container 12 elevated on the support structure 14 into the blender inlet. With the container 12 elevated on the support structure 14, the suspended bulk material has enough potential energy that when the discharge gate 42 is opened, the bulk material flows from the container 12 through the outlet 18 and directly into the blender 20. The outlet 18 may provide a choke feed for bulk material that is released from the container 12 on the support structure. This choke feed method is illustrated more specifically in FIG. 2, where bulk material 110 is shown exiting the bottom of the outlet 18 (i.e., chute) into a blender inlet 112 (e.g., hopper or mixer compartment).

As shown, the bulk material 110 may form a pile within the blender inlet 112. The outlet 18 may extend into the blender inlet 112 such that, once the pile of bulk material 110 is established, any additional bulk material is discharged from the outlet 18 at a fill level of the bulk material 110 already present in the blender inlet 112. The discharge gate (e.g., 42 of FIG. 1) of the container (e.g., 12 of FIG. 1) may be kept open to facilitate a flow of bulk material through the outlet 18 under a force due to gravity. The existing bulk material pile 110 in the blender inlet 112 may effectively choke off the supply of bulk material from the outlet 18 until some of the bulk material 110 is removed from the blender inlet 112. An angle of repose of the bulk material 110 in the pile may affect the flow rate of additional material from the outlet 18. As bulk material 110 is transferred from the blender inlet 112 to another location (e.g., via a metering device or pump) the used material may be replaced by bulk material that had previously stacked up in the outlet 18 and the container 12. This allows the bulk material 110 to flow into the blender inlet 112, instead of dropping into the blender inlet 112. As such, the bulk material does not fall and is not being impacted, and dust is not generated at this location.

In addition to reducing dust at this transfer point, the transfer of bulk material directly from the container 12 to the blender unit 20 of FIG. 1 also reduces the noise and engine emissions generated on location. Specifically, after the discharge gate 42 is opened to release bulk material from the container 12, the bulk material flows through the outlet 18 and into the blender unit 20 under a force due to gravity. As such, no conveyor belts or other powered conveyor devices are required to move the bulk material from the container 12 to the blender unit 20. This is different from conventional material handling equipment, which often relies on several diesel powerpacks (likely running at the same time) to provide the power to hydraulic components used to run a belt system for conveying bulk material from a receiving bin to the blender. The disclosed system 10, however, provides bulk material from the container 12 to the blender unit 20 by opening the discharge gate 42 and simply allowing the material to flow through the outlet 18 under gravity into the blender unit 20. This reduces the noise and engine emissions, since just one powerpack (or possibly no powerpacks) are operating at a time to move bulk material from the container 12 to the blender unit 20.

In some embodiments, the support structure 14 (with the frame 16 and the gravity feed outlet 18) may be integrated into the blender unit 20. In this manner, the system 10 may be a single integrated unit for receiving one or more containers 12 on the support structure 14, feeding bulk material from the containers 12 to the blender inlet, and mixing the bulk material with one or more fluids at the mixer 24 to produce the treatment fluid.

Although shown as supporting one container 12, other embodiments of the frame 16 may be configured to support other numbers (e.g., 2, 3, 4, 5, 6, 7, 8, or more) of containers 12. The exact number of containers 12 that the support structure 14 can hold may depend on a combination of factors such as, for example, the volume, width, and weight of the containers 12 to be disposed thereon.

In any case, each container 12 may be completely separable and transportable from the frame 16, such that any container 12 may be selectively removed from the frame 16 and replaced with another container 12. That way, once the bulk material from one container 12 runs low or empties, a new container 12 may be placed on the frame 16 to maintain a steady flow of bulk material to the blender unit 20. In some instances, a container 12 may be closed before being completely emptied, removed from the frame 16, and replaced by a container 12 holding a different type of bulk material to be provided to the blender unit 20.

It should be noted that the disclosed system 10 may be used in other contexts as well. For example, the bulk material handling system 10 may be used in concrete mixing operations (e.g., at a construction site) to dispense aggregate from the container 12 through the outlet 18 into a concrete mixing apparatus (blender 20). In addition, the bulk material handling system 10 may be used in agriculture applications to dispense grain, feed, seed, or mixtures of the same. Still other applications may be realized for transporting bulk material via containers 12 to an elevated location on a support structure 14 and dispensing the bulk material in a metered fashion through the one or more outlets 18.

In presently disclosed embodiments, one or more containers 12 of bulk material may be transported to the job location on a transportation unit (e.g., truck trailer) 32. In some instances, the one or more containers 12 may be transferred from the transportation unit 32 to a bulk material storage site 34 on location. This storage site 34 may be used to store one or more additional containers 12 of bulk material to be positioned on the frame 16 of the support structure 14 at a later time. The storage site 34 may be a skid, a pallet, or some other holding area designated for storing unused containers 12 of bulk material.

The bulk material containers 12 may be unloaded from transportation units 32 via a hoisting mechanism 36, such as a forklift, a crane, or a specially designed container management device, and brought to the storage site 34 until the container 12 is needed. One or more containers 12 may be transferred from the storage site 34 onto the support structure 14, as indicated by arrow 38, using the same or a different hoisting mechanism 36 that unloaded the containers 12 from the transportation units 32. In other embodiments, the hoisting mechanism 36 may be used to transfer one or more bulk material containers 12 directly from the transportation unit 32 to the support structure 14 where the contents of the containers 12 are then emptied into the blender unit 20. In such instances, the job site may or may not include a storage site 34 for unused containers 12 of bulk material.

When the container 12 is positioned on the support structure 14, the discharge gate 42 of the container 12 may be opened, allowing bulk material to flow from the container 12 into the respective outlet 18 of the support structure 14. The outlet 18 may then route the flow of bulk material directly into a blender inlet (e.g., into the hopper 22 or mixer 24) of the blender unit 20.

After the container 12 on the support structure 14 is emptied and/or the discharge gate 42 is closed, the same or a different hoisting mechanism 36 may be used to remove the empty container 12 from the support structure 14. In some embodiments, one or more empty or partially emptied containers 12 may be positioned at another bulk material storage site 34 (e.g., a skid, a pallet, or some other holding area), as indicated by arrow 40, until they can be removed from the job site (e.g., via a transportation unit 32) and/or refilled. In other embodiments, the one or more empty or partially emptied containers 12 may be positioned directly onto a transportation unit 32 for transporting the containers 12 away from the site. It should be noted that the same transportation unit 32 used to provide one or more filled containers 12 to the location may then be utilized to remove one or more empty or partially emptied containers 12 from the site.

The disclosed methods for transferring bulk material about the job site in containers 12 do not generate dust on location. This is because the bulk material is "transferred" from the transportation unit 32 to one or more positions on the job site within the fully enclosed containers 12. The containers 12 maintain the bulk material securely therein while the containers 12 are moved about the job site. Instead of the material being transferred from one container to another via pneumatic filling, conveyor belts, or other dust-generating transfer systems, the containers 12 filled with bulk material are removed from transportation units 32 and positioned at a desired location via the hoisting mechanism 36. No dust is generated during this process of unloading bulk material in containers 12 from the transportation units 32.

In addition, having the ability to lift the bulk material containers 12 off the transportation units 32 that arrive on location is a much quicker and quieter operation than conventional methods of pneumatically unloading material from tanker trailers. The unloading of a bulk material container 12 from the transportation unit 32 may take less than approximately 5 minutes using the hoisting mechanism 36, as opposed to a pneumatic unloading process that takes 1-2 hours to unload a conventional tank trailer. Because of the reduced unloading time, several transportation units 32 can be successively unloaded on location in a relatively short amount of time using the disclosed containerized system 10. When a transportation unit 32 pulls up to be offloaded and then the contents are replaced with an empty container 12, this entire process may last only approximately 20 minutes. There is little to no wait time (i.e., detention) for the transportation units 32 that arrive to the location for offloading and/or reloading. As a result, less noise and fewer engine emissions are generated around the location due to trucks idling and waiting to unload.

Furthermore, the disclosed system may utilize just a single powerpack on location (e.g., engine of the forklift or other hoisting mechanism 36) to move bulk material from the transportation unit 32 to the blender unit 20, as opposed to several engines or powerpacks running at the same time to pneumatically unload conventional tankers and/or convey bulk material to the blender. Thus, there is a reduction in the emissions footprint, as well as noise generation, using the disclosed systems and methods for moving bulk material about the location.

Figure 3:
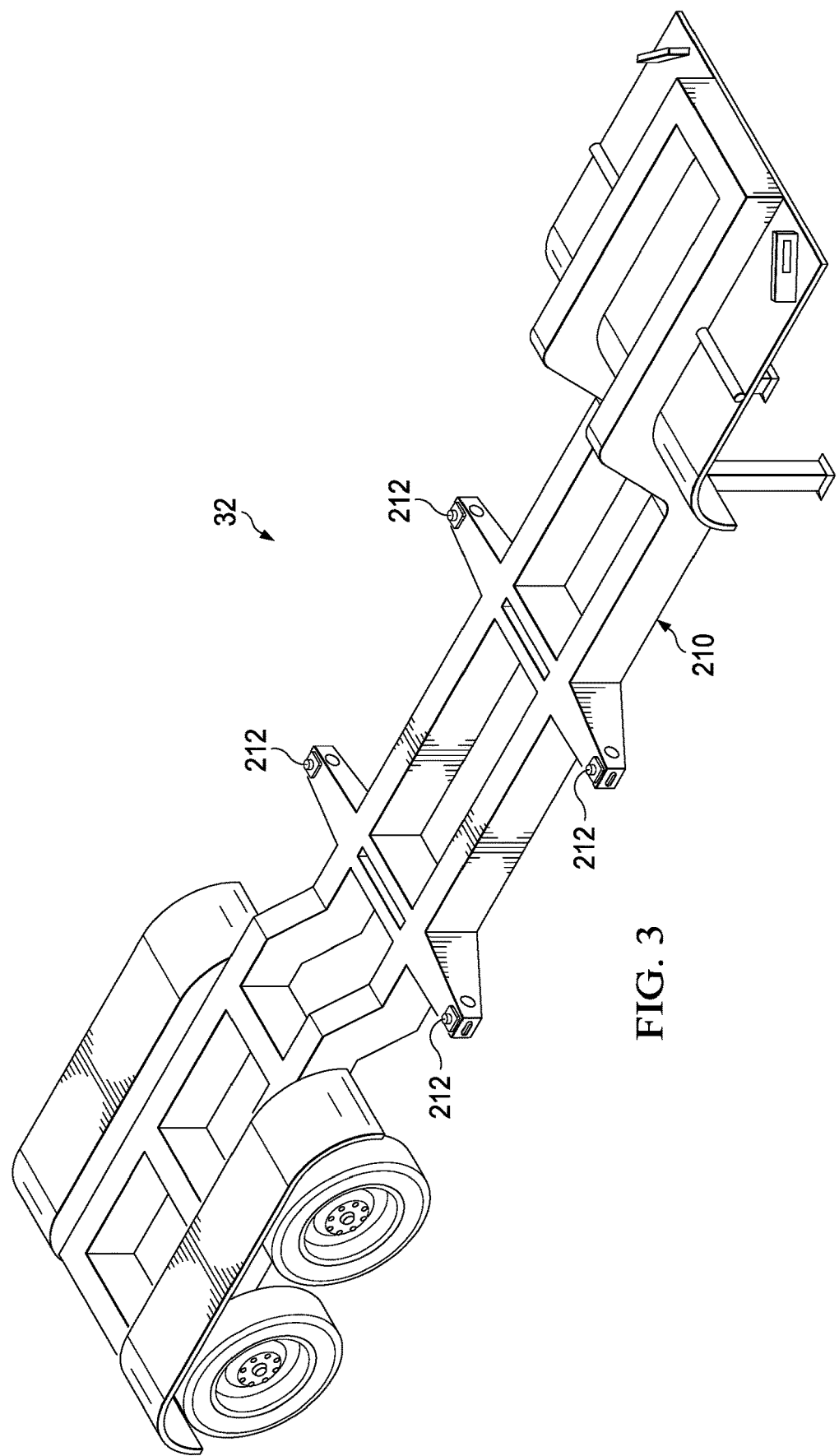
FIG. 3 is a perspective view of a transportation unit that may be used to carry a container of bulk material to or from a worksite, in accordance with an embodiment of the present disclosure.
Figure 4:
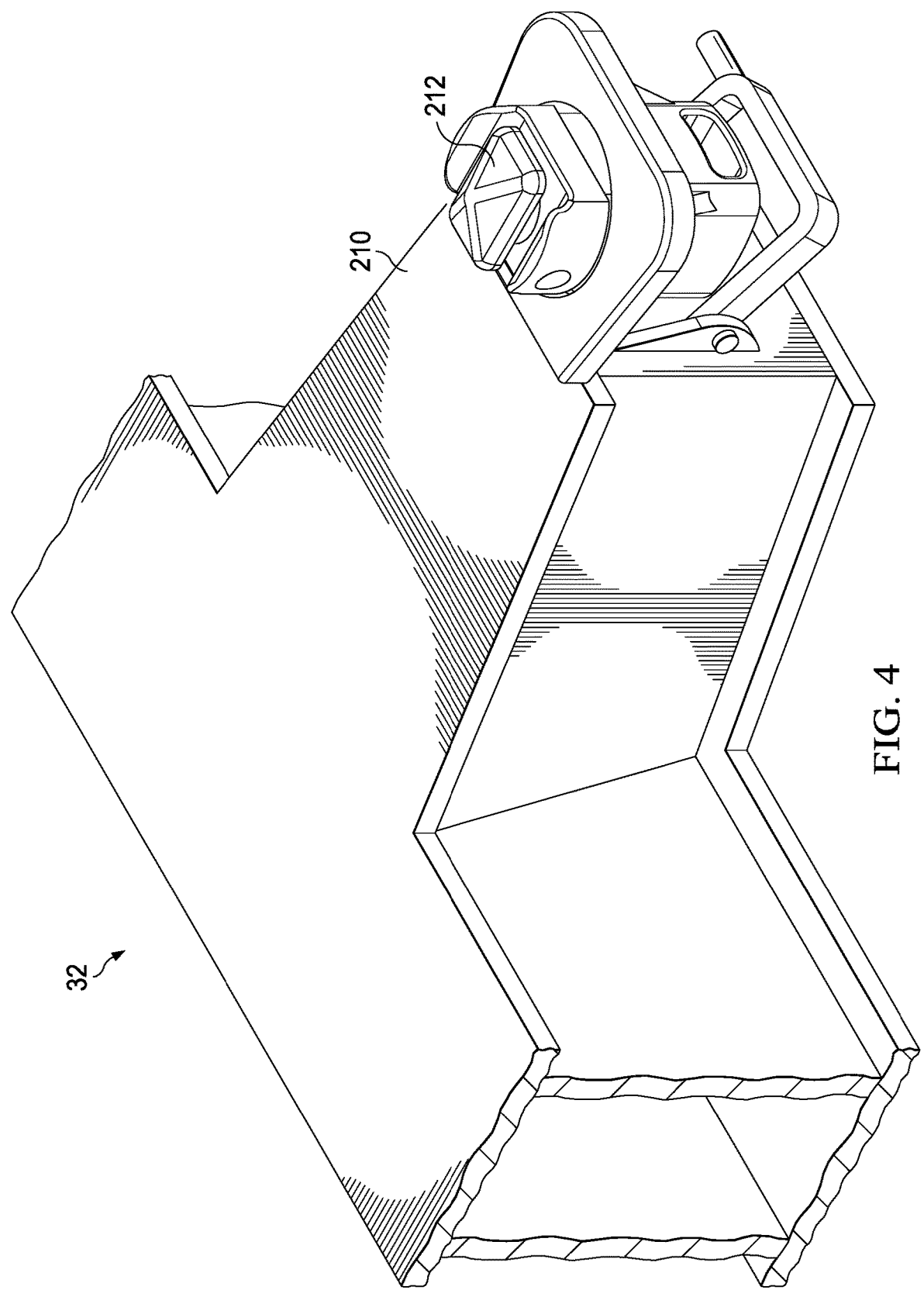
FIG. 4 is a perspective view of a lock used to fasten a container of bulk material to the transportation unit of FIG. 3, in accordance with an embodiment of the present disclosure.
Figure 5:
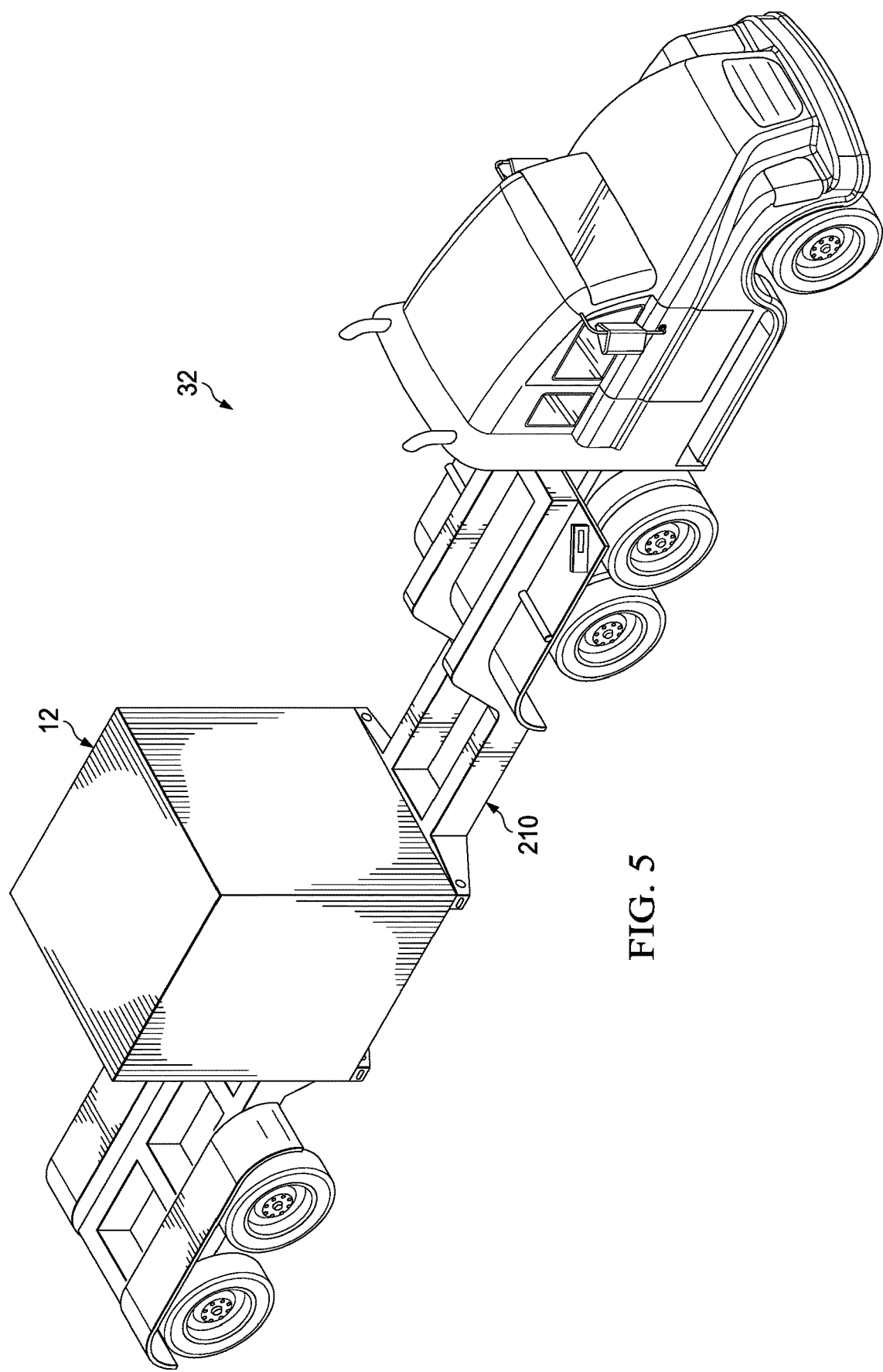
FIG. 5 is a perspective view of the transportation unit of FIG. 3 with a container of bulk material positioned thereon, in accordance with an embodiment of the present disclosure.

FIGS. 3-5 illustrate an embodiment of the transportation unit 32 that may be used in the disclosed bulk material handling operations. FIG. 3 illustrates the transportation unit 32, which may be a trailer 210 with multiple rails to support a container of bulk material thereon. As illustrated, the trailer may include four rails extending outward with locks 212 formed thereon to support the corners of a bulk material container. The bulk material container may be supported on the trailer 210 and secured at each corner to the trailer 210 via the locks 212.

FIG. 4 is a close-up view of one embodiment of a lock 212 that may be used on the trailer 210. As shown, the lock 212 may be an iso-twist lock that can be easily manipulated to secure the container to the trailer 210. However, other types of twist locks or other mechanically actuated locks may be used in other embodiments of the container trailer 210. The lock 212 may be simply rotated to unlock the container from the trailer 210. Thus, zero engine emissions are generated in the process of unlocking the container from the trailer 210. This lock 212 may also save time during the loading and unloading operations on location, allowing the container to be unlocked and removed from the trailer 210 in about 5 minutes.

FIG. 5 illustrates the container trailer 210 of FIG. 3 with a container 12 of bulk material disposed thereon and connected to the trailer 210 via the locks 212. Although only one container 12 is able to be supported on the illustrated trailer 210, other embodiments of the trailer 210 may be designed to support two or more containers 12. The number and arrangement of containers 12 that can be supported on the trailer 210 may be limited based on the weight of the containers 12, due to weight restrictions for roads over which the containers 12 will be transported. In some embodiments, the trailer 210 may include space for multiple containers 12, and this trailer 210 may be used to transport one container 12 filled with bulk material to the location and to transport multiple empty containers 12 away from the location. Or, a trailer 210 with multiple spaces available for containers 12 may be used to transport multiple containers 12 filled with relatively lighter or less dense bulk material.

The disclosed containerized system and method for handling bulk material at a job site may reduce the dust, noise, and engine emissions generated on location. By making the bulk material unloading/loading process on location more efficient, the disclosed techniques may reduce the amount of engine emissions generated from idling trucks, since transportation units may be able to unload their materials faster than would be possible using pneumatic transfer. In addition, the disclosed techniques may enable the transfer of bulk material on location without generating excessive noise that would otherwise be produced through a pneumatic loading process. Still further, the bulk material remains in the individual containers 12 until it is output directly into the blender unit 20 via the gravity feed outlet 18. Since the bulk material remains in the containers 12, instead of being released directly onto a conveyor, the containers 12 may enable movement of bulk material on location without generating a large amount of dust.

Although the present disclosure and its advantages have been described in detail, it should be understood that various changes, substitutions and alterations can be made herein without departing from the spirit and scope of the disclosure as defined by the following claims.

What is claimed is:

1. A method, comprising:
reducing dust by providing and/or using a portable support structure at a well job site, wherein the portable support structure is adapted for receiving one or more portable containers carrying bulk material, and wherein the portable support structure comprises one or more gravity feed outlets adapted for delivering the bulk material from the one or more portable containers directly into a blender inlet,
wherein reducing the dust comprises discharging the bulk material from a lower end of the gravity feed outlet directly into the blender inlet at a fill level of bulk material already present in the blender inlet without dropping the bulk material from a vertical height into the blender inlet.

2. The method of claim 1, wherein the portable support structure is configured to receive up to three portable containers at one time, and wherein the portable containers are substantially at the same elevation when received onto a frame of the portable support structure.

3. The method of claim 1, wherein the portable support structure is adapted for receiving the blender inlet proximate the one or more gravity feed outlets.

4. The method of claim 1, further comprising positioning a blender unit having the blender inlet underneath the portable support structure after positioning the portable support structure.

5. The method of claim 1, wherein the blender inlet is part of a blender unit, wherein the blender inlet comprises a hopper that is separate from a mixing compartment of the blender unit.

6. The method of claim 1, wherein the blender inlet comprises a mixer inlet.

7. The method of claim 1, further comprising positioning the portable support structure over a blender unit having the blender inlet such that the one or more gravity feed outlets are disposed in the blender inlet after positioning the blender unit.

8. The method of claim 1, further comprising removing the portable support structure from a trailer via a hoisting mechanism and positioning the portable support structure at a site.

9. A method, comprising:
reducing noise by providing and/or using a portable support structure at a well job site, wherein the portable support structure is adapted for receiving one or more portable containers carrying bulk material, and wherein the portable support structure comprises one or more gravity feed outlets adapted for delivering the bulk material from the one or more portable containers directly into a blender inlet,
wherein reducing the noise comprises discharging the bulk material from a lower end of the gravity feed outlet directly into the blender inlet at a fill level of bulk material already present in the blender inlet without dropping the bulk material from a vertical height into the blender inlet.

10. The method of claim 9, wherein the portable support structure is configured to receive up to three portable containers at one time, and wherein the portable containers are substantially at the same elevation when received onto a frame of the portable support structure.

11. The method of claim 9, wherein the portable support structure is adapted for receiving the blender inlet proximate the one or more gravity feed outlets.

12. The method of claim 9, further comprising positioning a blender unit having the blender inlet underneath the portable support structure after positioning the portable support structure.

13. The method of claim 9, further comprising positioning the portable support structure over a blender unit having the blender inlet such that the one or more gravity feed outlets are disposed in the blender inlet after positioning the blender unit.

14. The method of claim 9, further comprising removing the portable support structure from a trailer via a hoisting mechanism and positioning the portable support structure at a site.

15. A method, comprising:
reducing emissions by providing and/or using a portable support structure at a well job site, wherein the portable support structure is adapted for receiving one or more portable containers carrying bulk material, and wherein the portable support structure comprises one or more gravity feed outlets adapted for delivering the bulk material from the one or more portable containers directly into a blender inlet,
wherein reducing the emissions comprises discharging the bulk material from a lower end of the gravity feed outlet directly into the blender inlet at a fill level of bulk material already present in the blender inlet without dropping the bulk material from a vertical height into the blender inlet.

16. The method of claim 15, wherein the portable support structure is configured to receive up to three portable containers at one time, and wherein the portable containers are substantially at the same elevation when received onto a frame of the portable support structure.

17. The method of claim 15, wherein the portable support structure is adapted for receiving the blender inlet proximate the one or more gravity feed outlets.

18. The method of claim 15, further comprising positioning a blender unit having the blender inlet underneath the portable support structure after positioning the portable support structure.

19. The method of claim 15, further comprising positioning the portable support structure over a blender unit having the blender inlet such that the one or more gravity feed outlets are disposed in the blender inlet after positioning the blender unit.

20. The method of claim 15, further comprising removing the portable support structure from a trailer via a hoisting mechanism and positioning the portable support structure at a site.

* * * * *